United States Patent
Renfrew

[11] 4,008,212
[45] Feb. 15, 1977

[54] MONOAZO DYE MIXTURES DERIVED FROM 7-AMINO-4-NITROBENZOTRIAZOLE AND BIS-HYDROXYALKYLAMINO ACYLANILIDES REACTED WITH ACID HALIDES AND AMIDES

[75] Inventor: Edgar E. Renfrew, Flemington, Pa.

[73] Assignee: American Color & Chemical Corporation, Charlotte, N.C.

[22] Filed: Apr. 4, 1974

[21] Appl. No.: 457,979

Related U.S. Application Data

[62] Division of Ser. No. 374,771, June 28, 1973, Pat. No. 3,860,389.

[52] U.S. Cl. .................... 260/157; 260/456 A; 260/463; 260/475 P; 260/476 R; 260/490
[51] Int. Cl.² .................. C09B 29/08; C09B 29/26; C09B 43/18
[58] Field of Search .................................... 260/157

[56] References Cited
UNITED STATES PATENTS

| | | | |
|---|---|---|---|
| 2,675,376 | 4/1954 | Scalera et al. | 260/157 |
| 3,116,276 | 12/1963 | Gross et al. | 260/157 X |

FOREIGN PATENTS OR APPLICATIONS

| | | | |
|---|---|---|---|
| 1,134,175 | 11/1968 | United Kingdom | 260/157 |

Primary Examiner—Charles F. Warren
Attorney, Agent, or Firm—Armstrong, Nikaido & Wegner

[57] ABSTRACT

A monoazo dye mixture which is the reaction product of the diazo base of 7-amino-4-nitrobenzotriazole and a coupling component of the formula

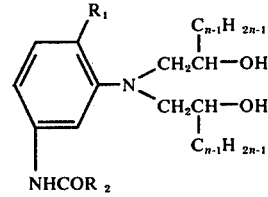

wherein $R_1$ is H or lower alkoxy; $R_2$ is an alkyl radical having 1–4 carbon atoms, phenyl, tolyl, or chlorophenyl; and $n$ has a value of 1–2. The hydroxyalkyl groups of the coupling component are reacted prior or subsequent to coupling with at least stoichiometric quantities of both: (1) a lower alkyl chlorocarbonate, lower alkanoyl chloride, benzoylchloride, methylbenzoylchloride, ethylbenzoyl chloride, phthaloyl chloride, isophthaloyl chloride, ter phthaloyl chloride or lower alkylsulfonyl chloride and (2) a mono- or di-lower alkyl formamide or acetamide, at a temperature of 30°–100° C until the reaction mixture is substantially free of unreacted hydroxyalkyl groups. The dye mixture produces excellent dyeings on polyester fabric materials.

7 Claims, No Drawings

MONOAZO DYE MIXTURES DERIVED FROM 7-AMINO-4-NITROBENZOTRIAZOLE AND BIS-HYDROXYALKYLAMINO ACYLANILIDES REACTED WITH ACID HALIDES AND AMIDES

This is a division of application Ser. No. 374,771, filed June 28, 1973, now U.S. Pat. No. 3,860,389.

BACKGROUND OF THE INVENTION

Although certain aminobenzotriazoles have been reported for a wide variety of uses in the prior art, the disclosure of such compounds as dyes for polyester fibers has been relativey limited. Various compounds are reported in the literature, such as Sasse et al., U.S. Pat. No. 2,943,017, who reports certain benzotriazoles as being suitable for fungicidal use. Additional benzotriazoles are reported in patents to Hanhart, U.S. Pat. No. 2,671,775; Scalera, U.S. Pat. No. 2,675,376; Margot et al., U.S. Pat. No. 2,806,035; and Mingasson, U.S. Pat. No. 3,417,075. Various azo derivatives of benzotriazoles are reported where the aminonitrobenzotriazole is diazotized, and then reacted with a coupler. French patent No. 1,471,064, reports certain benzotriazoles as dyestuffs; however, such dyestuffs are quaternary compounds which are primarily exemplified as acrylonitrile dyestuffs.

In accordance with the invention there are provided a new class of dyestuffs produced from diazotized 7-amino-4-nitrobenzotriazole, which yield excellent dyeings on polyester fabrics.

SUMMARY OF THE INVENTION

In accordance with our invention, a monoazo dyestuff is provided which consists essentially of the reaction product of:

a. diazotized 7-amino-4-nitrobenzotriazole and;
b. a coupling component of the formula:

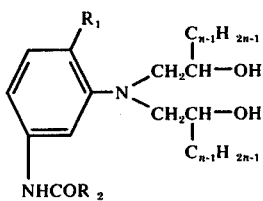

wherein $R_1$ is H or lower alkoxy, and $R_2$ is an alkyl radical having 1–4 carbon atoms or phenyl, tolyl or chlorophenyl and $n$ has a value of 1–2. The hydroxy alkyl groups of the coupling component are reacted either before or after coupling with at least stoichiometric quantities of both 1. certain acid halides, e.g., the alkylchlorocarbonates, acylhalides, alkylsulfonylchlorides, arylsulfonylchlorides, thionylchloride and
2. a mono- or di-N-substituted lower alkyl formamide or acetamide at an elevated temperture of 30° to 100° C. until the reaction mixture is substantially free of unreacted coupling component.

The reaction product is a mixture that we have been unable to positively identify using any of the ordinary means of structural analysis; e.g., infrared, nuclear magnetic resonance, or elemental analysis. By melting point measurements and chromatography, as well as by performance, we have determined that the amide clearly takes part in the reaction.

DETAILED DESCRIPTION

The modification of the hydroxyalkyl groups of the coupling component can be accomplished either before or after coupling. A coupling component modified prior to coupling is useful per se in the preparation of dyestuffs by merely coupling the modified component with any dizaotized amine capable of couplng in an acid medium.

The coupling component may be modified according to the method of the invention by dissolving it in one of the designated amides, which is conveniently used in the reaction as a solvent as well as a reactant, and adding thereto at least a stoichiometric quantity (two moles based on the hydroxyalkyl groups in the coupler) and preferably a 25–50 percent excess over the stoichiometric amount, of the strong acid halide. The use of the amide as a solvent obviously provides a sufficient amount, based on the coupler, of N-substituted amide. It is possible, of course, although less convenient, to add the N-substituted amide in at least a stoichiometric quantity and conduct the reaction in an inert medium, such as dioxane.

The reaction is run at a temperature between 30° and 100° C. and is continued for several hours until unreacted dihydroxyalkyl compound is substantially absent from the reaction mixture. The reaction time will vary with the temperature and for this reason it is preferable to use higher temperature of, for example, 60°–100° C. to complete the reaction in acceptable amount of time. The degree of completion of the reaction can be determined easily by an examination of the product. If there is a substantial amount of dihydroxyalkyl component in the final product, the light fastness of the insufficiently reacted product, as determined by accelerated laboratory testing methods, is markedly inferior to a completely reacted product. The entry of the amide into the reaction facilitates the elimination of unreacted dihydroxyalkyl compound.

Thin-layer-chromatographic analysis verifies the fact that the dyestuffs prepared according to the invention are complex mixtures. The thin-layer-chromatograhic analysis technique separtes the dyestuff into its various components. A suitable technique is to first prepare a 5% solution of the dyestuff in acetone. Four microliters of that solution is spotted on a glass plate on which had been previously cast a 250 micron layer of silica gel. After drying, the spot is eluted with a 4/1 by volume benzene/acetone solution. As the dyestuff spot migrates vertically up the plate the various components of the dyestuff separate. That is, depending upon factors such a polarity and relative solubility in the elution liquid, each component will migrate to a different height on the plate. In that manner, it can be verified that dyestuffs prepared according to the method of the invention are complex mixtures. The chromatographs also show that the amide enters into the reaction, and that the mixtures are of the same composition, regardless of which of the designated amides and other reactants are employed to modify the hydroxyalkyl groups of the coupling component.

Suitable formamides and acetamides are N,N-dimethylformamide, N,N-dimethylacetamide, N,N-diethylacetamide, N,N-diethylformamide, N,N-di-t-butylformamide and N-mono-t-butylformamide.

Examples of suitable alkylchlorocarbonates useful in the process of the invention are ethylchlorocarbonate, methylchlorocarbonate and t-butylchlorocarbonate.

Suitable carboxylic acylhalides are, for example, acetyl chloride, propionyl chloride, benzoyl chloride, and butyryl chloride. Illustrative of useful sulfonylchlorides are benzene sulfonylchloride, methane sulfonylchloride and t-butylsulfonylchloride.

As noted above, the coupling can be carried out either before or after the modification of the coupling component. The coupling reaction is carried out in the conventional manner 0°–5° C. in an aqueous acid medium, with or without the use of an acid-binding agent, such as sodium acetate. After the coupling reaction, the precipitated monoazo dystuffs are filtered off and washed.

Of particular importance is a new class of monoazo dyestuffs prepared according to the method of the invention by reacting:

a. diazotized 4-amino-7-nitrobenzotriazole; and
b. a coupling component of the formula:

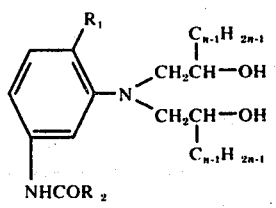

wherein $R_1$, $R_2$ and $n$ have the meanings aforesaid.

The hydroxyalkyl groups of the coupling component are reacted, either before or after coupling, with at least a stoichiometric quantity of a lower alkyl chlorocarbonate, lower alkanoyl chloride, benzoyl chloride, methylbenzoylchloride, ethylbenzoyl chloride, phthaloyl chloride, isophthaloyl chloride, terephthaloyl chloride, terephthaloyl chloride or lower alkylsulfonyl chloride and at least stoichiometric quantities of a di-lower alkylformamide, such as dimethylformamide or diethylformamide, at an elevated temperature of 30°–100° C. until the reaction is substantially completed.

As lower alkyl chlorocarbonates and lower alkylsulfonyl chlorides are contemplated compounds containing up to 6 carbon atoms.

Diazotization of the 7-amino-4-nitrobenzotriazole is carried out, for example, by stirring the diazotizable amine to solution in concentrated sulfuric acid at 20°–25° C and adding nitrosyl sulfuric acid thereto to form the diazo compound, which is held for the coupling step.

Dyestuffs prepared according to the invention may be standardized either as a disperse paste or a disperse powder by any of the basic standardizing techniques that have been known to the art for many years; i.e., by the use of appropriate amounts of common dispersants and standardizing agents, usually together with small amounts of anionic wetting agent to assist in dispersion.

Standardized pastes are made by wet milling the dye in conventional equipment in the presence of a dispersing agent, preferably sodium lignin sulfonate or sodium alkylnaphthalene sulfonate. Various other commercially available dispersing agents, such as sodium salts of carboxylated polyelectrolytes and the naphthalene sulfonates; e.g., the condensation products of sulfonated naphthalene and formaldehyde, such a sodium dinaphthylmethane disulfonate, are conveniently used. The dispersed paste is cut or standardized to a standard strength with a diluent, such as sodium sulfate or dextrin. As noted above, any conventional wetting agent, e.g, sodium cetyl sulfonate may be added to wet out the product. The final color content of the finished paste averages from 10–40 percent by weight (pure color) active dyestuff base.

Standarized dispersed powders are prepared by wet milling color in the presence of a dispersant, such as those mentioned hereabove, in equipment, such as a ball mill, Werner-Pfleiderer mill or attritor. The dispersed material is oven or spray dried and micropulverized if necessary to provide the dispersed powder. The color is cut or standardized to a standard strength in a blender with a diluent, such a sodium sulfate or dextrin. A wetting agent, such as sodium cetyl sulfate or an alkylphenyoxy polyethanol may be added to wet out the product. Dispersed powders are usually cut or standardized to 25–60 percent by weight color content (Pure color).

The dyestuffs are applied by known methods for dyeing polyesters, either in a dispersion with a carrier at 50°–100° C. or without a carrier at 100°–150° C under pressure. Printing and padding are carried out in the presence of suitable thickening agents followed by fixation at high temperatures with or without steam. The novel dyestuffs produce uniform shades over a temperature range of 180°–220° C. when applied by the Thermosol process.

The invention is further illustrated by the following examples:

EXAMPLE I

A diazo solution is prepared by charging to a 500ml. flask 200 g. 94 percent sulfuric acid and adding thereto at 20°–25° C. at 83.5 g. 7-amino-4-nitrobenzotriazole. The mixture is stirred to solution and maintained at 20°–25° C. There is then added dropwise 50 g. nitrosyl sulfuric acid below 25° C. The resulting diazo solution is stirred overnight at 20°–25° C. and held for the coupling reaction.

EXAMPLE II

To a 500 ml. flask there is charged 56.5 g. of 3-bis-hydroxyethylamino-4-ethoxyacetanilide (0.2 mole) and 85 g. of dimethylformamide. The mixture is heated to 65°–70° C. then cooled to 5°–10° C. A 4 g. quantity of pyridine (about five percent, based upon the amount of dimethylformamide) is added thereto. At a temperature between 5° and 10° C. there is added dropwise 60 g. of ethyl chloroformate. After the addition of the ethyl chloroformate, the solution is allowed to come to room temperature and stirred overnight. It is then heated to 75° C., cooled to room temperature and poured into 1200 g of ice and water containing 30 g. of 20° Baume hydrochloric acid.

EXAMPLE III

To the resulting slurry of Example II is added 275 g. of the above-prepared diazo solution of Example I at a temperature below 5° C. The reaction mixture is allowed to reach room temperature over a period of 5 hours. The product is separated by filtration, washed with cold water, reslurried in a one percent soda ash solution, and stirred at room temperature overnight. The slurry is filtered and washed in cold water to give a wet cake weighing 346.7 g. (30 percent solids). A thin-layer-chromatograph of the dyestuff shows it to have a complex mixture component.

EXAMPLE IV

A dispersion is prepared containing 12.75 percent of the dye of Example III and 37.25 percent sodium lignin sulfonate dispersant together with a small amount of glycerin and enough water to bring the solids content of the solution to 50 percent by weight. The paste is then milled until the dyestuff is sufficiently dispersed.

An aqueous solution of 1 percent by weight of monosodium phosphate and twenty percent by weight based on the weight of fabric dyed, of a commercially available phenolic carrier is prepared. The resulting solution is heated to 120° F. and 10 g. of Dacron polyester fabric is added thereto. The temperature is maintained for 10 minutes and 2 percent by weight of the dyestuff paste prepared as described above is added to the bath. The resulting dye bath is heated at 208° F. and maintained at this temperature for 90 minutes. The dyed fabric is removed and after-soaped by working it in a 1 percent soap solution at 180° F. for 10 minutes. It is then rinsed and dried. The dyed fabric appears reddish-blue in color. The dyeing is characterized by being fast to light and having good sublimation properties.

EXAMPLE V

To a 500 ml. flask there is charged 100 cc. dimethylformamide and 56.5 g. 3-bis-hydroxyethylamino-4-ethoxybenzanilide (0.2 mole). The mixture is heated to 60°–65° C. and then cooled. At 5°–10° C. over a period of 1 hour there is added 44 g. ethyl chlorocarbonate (0.2 mole). The mixture is held at room temperature for 6 hours. 15 grams additional ethyl chlorocarbonate (33 percent excess) is added and the mixture is heated to 75° C. and held for one-half hour. The reaction mixture is drowned in 1200 g. ice water containing 30 g. 20° Baume hydrochloric acid.

EXAMPLE IV

The product of Example V is coupled with the base of Example I by adding 260 g. diazo solution dropwise at 0°–5° C. The reaction mixture is agitated overnight and the product is separated by filtration and washed with water. The press cake is reslurried with 50 g. soda ash, filtered, and washed with water at 50° C. There is thus obtained 387 wet cake having a solids content of 26 percent. Dyeings made in the usual manner show that the product is a reddish-blue dyestuff characterized by the same excellent sublimation and good light fastness.

EXAMPLE VII

The procedure of Example V is substantially repeated with the exception that 3-bis(hydroxyethyl)amino benzanilide is used in place of 3-bis (hydroxyethyl)amino-4-ethoxybenzanilide. After coupling in accordance with Example VI, a mixture with the dyeing properties comparable to Example VI is obtained, the color however being more of a violet shade.

EXAMPLE VIII

By substituting diethylformamide for the dimethylformamide in the procedure of the preceding examples, dyestuffs of similar performance characteristics are obtained.

EXAMPLE IX

A reddish-blue dyestuff having excellent affinity, good light fastness, and excellent sublimation properties is prepared by using 3-diisopropanol-amino-4-methoxyacetanilide as the coupling component in the procedure of Example II.

EXAMPLE X

The procedure of Example II is repeated with the exception that 200 CC. of N,N-dimethylacetamide is used in place of the N,N-dimethylformamide. A dyestuff with properties similar in every respect to that of Example III is thereafter prepared. Thin-layer-chromatographs show the dyestuff to be essentially the same at that of Example III.

EXAMPLE XI

The procedure of Example II is repeated with the exception that 150 cc. of N-t-butylformamide is used in place of the N,N-dimethylformamide. Thin-layer-chromatographs show the dyestuff prepared therefrom to be essentially the same as that of Example III.

EXAMPLE XII

The procedure of Example II is repeated with the exception that 150 cc. of N,N-di-t-burylformamide is used in place of the N,N-dimethylformamide. Thin-layer-chromatographs show the dyestuff prepared therefrom to be essentially the same as that of Example III.

What is claimed is:

1. The monoazo dyestuff consisting essentially of the reaction product of
   a. the diazo base of 7-amino-4-nitrobenzotriazole; and
   b. a coupling component of the formula

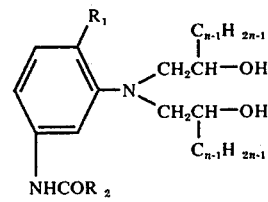

wherein $R_1$ is H or lower alkoxy; $R_2$ is an alkyl radical having 1–4 carbon atoms, phenyl, tolyl, or chlorophenyl; and $n$ has a value of 1–2; the hydroxyalkyl groups of the coupling component being reacted prior or subsequent to coupling with at least stoichiometric quantities of both:
   1. a lower alkyl chlorocarbonate, lower alkanoyl chloride, benzoylchloride, methylbenzoylchloride, ethylbenzoyl chloride, phthaloyl chloride, isophthaloyl chloride, terephthaloyl chloride or lower alkylsulfonyl chloride, and
   2. a mono- or di-lower alkyl formamide or acetamide, at a temperature of 30°–100° C. until the reaction mixture is substantially free of unreacted hydroxyalkyl groups.

2. The dyestuff of claim 1 wherein the compound (1) is ethyl chlorocarbonate and the formamide is dimethylformamide.

3. The monoazo dyestuff of claim 1 wherein said hydroxyalkyl groups of said coupling component are reacted with at least stoichiometric quantities of said lower alkyl chlorocarbonate.

4. A dyestuff of claim 1 wherein said coupling component is treated with said lower alkyl chlorocarbonate and dimethylformamide at a temperature of 60°–100° C.

5. A dyestuff according to claim 1 wherein said lower alkyl chlorocarbonate is ethyl chlorocarbonate.

6. The monoazo dyestuff of claim 1 wherein the reaction of the hydroxyalkyl groups of the coupling component is carried out prior to coupling.

7. the monoazo dyestuff of claim 1 wherein the reaction of the hydroxyalkyl groups of the coupling component is carried out subsequent to coupling.

* * * * *